United States Patent [19]
Iyengar et al.

[11] Patent Number: 5,367,659
[45] Date of Patent: Nov. 22, 1994

[54] TAG INITIALIZATION IN A CONTROLLER FOR TWO-WAY SET ASSOCIATIVE CACHE

[75] Inventors: Sundaravarathan R. Iyengar; James Nadir, both of San Jose, Calif.

[73] Assignee: Intel Corporation, Santa Clara, Calif.

[21] Appl. No.: 216,082

[22] Filed: Mar. 21, 1994

Related U.S. Application Data

[63] Continuation of Ser. No. 767,700, Sep. 30, 1991, abandoned.

[51] Int. Cl.$^5$ .................. G06F 13/00; G06F 12/04; G06F 12/06
[52] U.S. Cl. .................. 395/425; 364/243.41; 364/243.4; 364/260; 364/DIG. 1
[58] Field of Search .......... 395/425; 364/200 MS File, 900 MS File, 243

[56] References Cited
U.S. PATENT DOCUMENTS

| | | | |
|---|---|---|---|
| 4,580,240 | 4/1986 | Watanabe | 395/425 |
| 4,719,568 | 1/1988 | Carrubba et al. | 395/425 |
| 4,736,293 | 4/1988 | Patrick | 395/425 |
| 4,833,642 | 5/1989 | Ooi | 365/49 |
| 4,934,512 | 7/1990 | DeKarske et al. | 365/49 |
| 5,073,891 | 12/1991 | Patel | 371/21.3 |
| 5,157,774 | 10/1992 | Culley | 395/425 |

*Primary Examiner*—Joseph L. Dixon
*Assistant Examiner*—Frank J. Asta
*Attorney, Agent, or Firm*—Owen L. Lamb

[57] ABSTRACT

A cache controller tag ram is configured into a two ways, each way including tag and valid-bit storage for associatively searching the directory for cache data-array addresses. The two ways, a right way and a left way, each store tag addresses. First means are provided for asserting a flush signal upon the condition that a warm start reset is recognized or a power up condition is recognized. Logic causes all pending write requests to be withdrawn in response to the flush signal. The directory is cleared by setting all valid, write protect and least recently used (LRU) bits to zero in both of the ways. Subsequent write requests use a line fill algorithm to ensure that correct data is written into the directory by choosing which way to select for a line fill after the bits have been cleared.

3 Claims, 4 Drawing Sheets

FIG. 2

| | SET | LEFT WAY | | | | RIGHT WAY | | | | LRU |
|---|---|---|---|---|---|---|---|---|---|---|
| | | $t_1$ | $v_0$ | $v_1$ | $w_p$ | $t_2$ | $v_0$ | $v_1$ | $w_p$ | |
| POWERUP | X | X | X | X | X | X | X | X | X | X |
| RESET | X | X | 0 | 0 | X | X | 0 | 0 | X | 0 |

FIG. 3

| TAG RAM CONTENTS | ACCESS ADDRESS | | HIT LEFT | HIT RIGHT | LRU POINTER | WAY SELECT |
|---|---|---|---|---|---|---|
| $t_1 \neq t_2$ | $s_1$ | $t_1$ | 1 | 0 | X | LEFT |
| | $s_1$ | $t_2$ | 0 | 1 | X | RIGHT |
| | $s_1$ | $t_3$ | 0 | 0 | 0 | LEFT |
| $t_1 = t_2$ | $s_1$ | $t_1$ | 1 | 1 | X | RIGHT |
| | $s_1$ | $t_2$ | 1 | 1 | X | RIGHT |
| | $s_1$ | $t_3$ | 0 | 0 | 0 | LEFT |

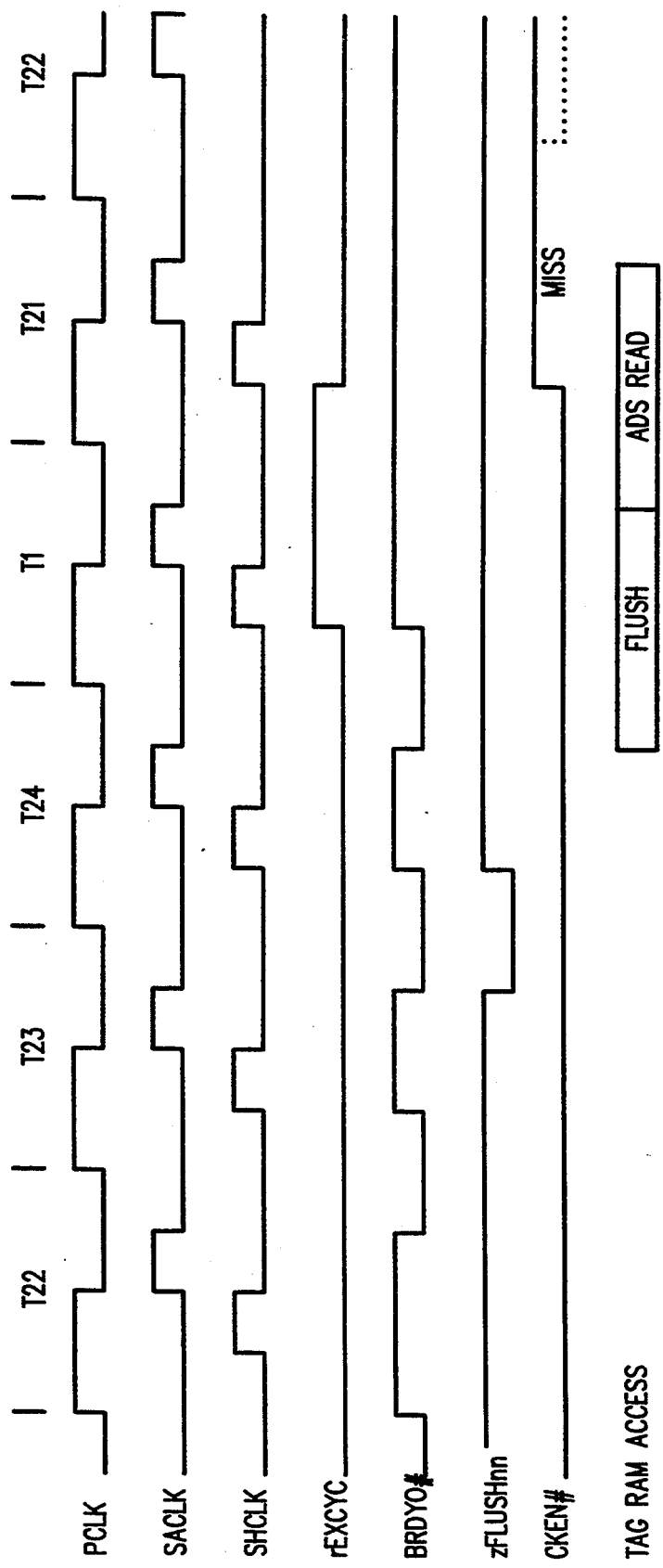
FIG. 5 FLUSH CYCLE

TAG INITIALIZATION IN A CONTROLLER FOR TWO-WAY SET ASSOCIATIVE CACHE

This application is a continuation of Ser. No. 07/767,700 filed Sept. 3, 1991 now abandoned.

CROSS-REFERENCE TO RELATED APPLICATION

This application is related to U.S. Pat. No. 5,210,845, of John H. Crawford, et al., entitled "Controller for Two-way Set Associative Cache", granted on May 11, 1993; U.S. patent application Ser. No. 07/684,180, of Yong Lee, et al., entitled "Critical Timing Management in a Controller for Two-way Set Associative Cache", filed on Apr. 12, 1991; and to U.S. patent application Ser. No. 07/691,240, of Sundaravarathan R. Iyengar, entitled "LRU Pointer Updating in a Controller for Two-way Set Associative Cache", filed on Apr. 4, 1991, of all of which are assigned to Intel Corporation, the assignee of the present invention.

1. Technical Field

The present invention relates to data processing systems and more particularly, to a method and means for power on and reset initialization of a tag random access memory (RAM) in a controller for a data cache.

2. Background Art

A cache is a relatively high-speed, small, local memory which is used to provide a local storage (a buffer store) for frequently accessed memory locations of a larger, relatively slow, main memory (a backing store). By storing the information or a copy of the information locally, the cache is able to intercept memory references and handle them directly without transferring the request to the main memory over the memory bus. The result is lower traffic on the memory bus and decreased latency on the central processing unit (CPU) bus to the requesting processor.

The above-referenced U.S. patent applications disclose a cache controller which has a tag RAM which is configured into two ways, each way including tag and valid-bit storage for associatively searching the directory for cache data-array addresses. The external memory is organized such that both the cache and the external memory can be searched in parallel.

In U.S. patent application Ser. No. 07/691,240, an algorithm controls a least recently used (LRU) pointer to select which way to fill on a line fill cycle. The right way is selected for a line fill in response to a right hit signal provided that the LRU pointer points to the right way. The LRU pointer is flipped to point to the left way upon the filling of the right line of the right way. The left way is selected for a line fill in response to a left hit signal provided that the LRU pointer points to the left way. The LRU pointer is flipped to point to the right way upon the filling of the left line of the left way. The LRU pointer is only updated on a read miss cycle and a write hit cycle, and is left unchanged on a read hit cycle. By not updating the LRU pointer on a read hit, the algorithm favors a buffer/backing store system in which traffic on the bus is predominantly write cycles.

On cold-start power on and warm-start reset, the contents of a tag RAM must be cleared of data so that residual data will not corrupt the tag RAM address access with spurious data. To clear all of the bits in the system described in the above referenced patent applications would require that 41 bits be cleared, requiring a large amount of wiring and circuit delays.

It is therefore an object of the present invention to provide a method and means for clearing a tag RAM in a controller for a data cache that uses a minimum number of wires.

SUMMARY OF THE INVENTION

Briefly, the above object is accomplished in accordance with the invention by providing a cache controller tag RAM directory configured into two ways, a right way and a left way, each way including stored tag addresses, valid bits, and a write protect bit, there being least recently used (LRU) pointers that can be set to point to either the left way or the right way to indicate, as between the left way and the right way, a least recently used data entry.

A first signal is asserted upon a first condition that a warm start reset state is recognized and a second condition that a power up state is recognized. In response to this first signal, all pending write requests are withdrawn and only the valid bits, and the write protect bit are set to zero in each of the ways. The LRU pointers are set to zero to thereby point to the left way. A write cycle is started upon a second condition that the first signal is unasserted.

A search tag address presented to the directory is compared with the stored tag addresses and a right hit signal is generated upon a third condition that a match exists between the search tag address and one of the stored tag addresses stored in the right way. A left hit signal is generated upon a fourth condition that a match exists between the search tag address and one of the stored tag addresses stored in the left way.

The right way is selected for a right line fill in response to the right hit signal and a corresponding least recently used pointer is flipped to point to the left way upon the filling of the right line of the right way. The left way is selected for a left line fill in response to the left hit signal and the corresponding least recently used pointer is flipped to point to the right way upon the filling of the left line of the left way.

BRIEF DESCRIPTION OF THE DRAWINGS

The invention will be apparent from the following, more particular description of the preferred embodiment of the invention as illustrated in the accompanying drawings, wherein:

FIG. 2 is a table showing the bits that are set to zero on power up and reset in the controller shown in FIG. 1;

FIG. 3 is a table showing accesses occurring under different conditions which exist in the tag RAM controller after power up or reset;

FIG. 5 is timing diagram of the power on/reset procedure.

DESCRIPTION OF THE PREFERRED EMBODIMENT

Figure 1:
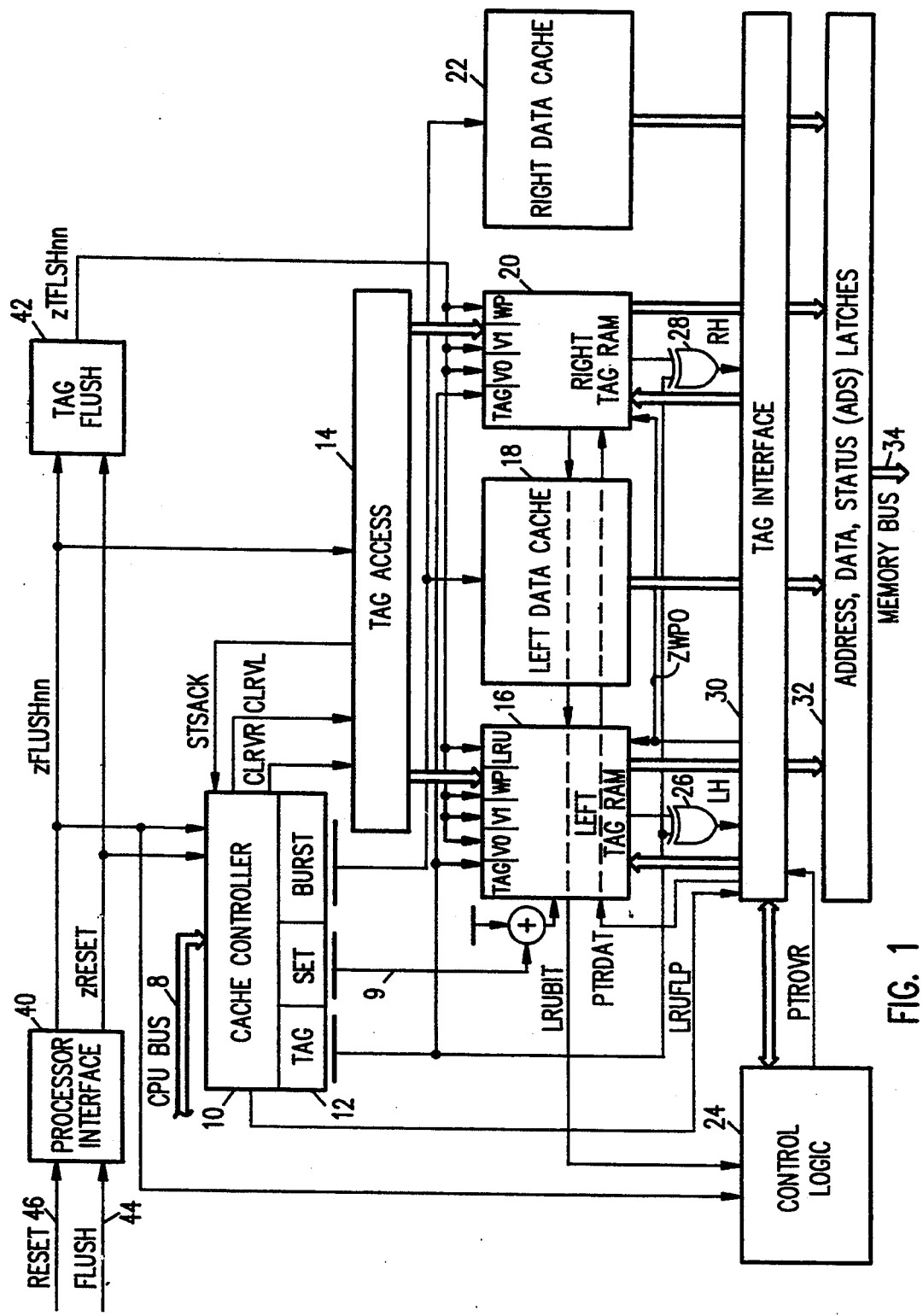
FIG. 1 is a block diagram of a two-way, set associative cache in which the invention is embodied.

Refer now to FIG. 1 which is a block diagram of the cache controller described in U.S. Pat. No. 5,210,845 and in which the present invention is embodied. The controller monitors CPU address bus activity (8) to determine when it needs to search its internal tag RAM. Internally, the cache controller maintains the TAG address and Status of each data cache line.

The function of the tag RAM directory (16, 20) is to store addresses which correspond to data which are stored in the cache memory. The directory is configured into two ways (WAY0, WAY1). A line is the basic unit of data transferred between the cache and the main memory. It consists of 16 bytes of data. A line is also known as a transfer block. If the data corresponding to a particular address is stored in the cache, the cache can supply the data, thus avoiding a main memory access. This is referred to as a "cache hit." The decision, hit or miss, is determined on a per line basis. An address block is the basic unit of cache addressing. Each address block describes the physical address of one of two contiguous lines of data. There is a valid bit ($v_0$, $v_1$) associated with each line within an address block. If the line is present in the cache, then the valid bit is turned on. The address information held in the cache directory is referred to as a tag of 17 bits. Since many addresses map to a single address block, the tag information is used to identify the exact memory locations that are currently associated with an address block. A hit occurs when the tag of an address block matches the bus address and the desired line valid bit is on. Each way is also provided with a write protect (WP) bit. An LRU bit is provided in way 0, the left way, to indicate the least recently used (LRU) line of data.

Each way provides storage for the tag and valid bits. Multiple simultaneous comparisons are made in the compare circuits between the CPU bus address (8) and the tag fields in the ways to determine if the data is in the cache data array. A set is a grouping of address blocks consisting of one address block from each way. All of the address blocks in a set are simultaneously selected when a portion of the CPU bus address is decoded into a set address (9) by a decoder in the cache controller (10).

When a new block of data needs to be pulled into the cache, it may be necessary to remove an old block of data that is already in the cache to make room for the new data. There is a sequence described in patent application Ser. No. 07/691,240 that uses the LRU bits to determine which way gets replaced when a new address is needed in an address block.

When a write transaction on the CPU bus involves an address which is not in the cache (a cache miss), no attempt is made to store the corresponding data in the cache. However, when a write transaction on the CPU bus involves an address which is in the cache (a cache hit), the directory uses a write-through policy. This means that the data are written into both the cache and the main memory. This ensures that main memory always holds a valid copy of all data locations that reside in the cache.

During power up or reset the tag addresses are not cleared. Only the status bits and the LRU pointer are cleared. Since during power up or reset only the status bits and the LRU pointer are cleared there will remain stored in the tag RAM addresses (tags) that will cause a hit to occur if one of those addresses is presented to the tag RAM as a search argument. In fact, after power-up, the same tag may be present in two locations, such that a hit may occur on both the left and right side. A mechanism, described below, is provided to resolve conditions which could cause spurious tag address to result in unreliable operation.

Refer to FIG. 2 which is a table showing the bits that are set to zero on power up and reset in the controller (10) shown in FIG. 1. On power up, all of the bits may take on any random value x. At reset, only 7 bits are set to zero, the status bits ($V_0$, $V_1$, WP) in each way and the LRU bit in the left way (16). The 34 remaining bits of the tag addresses ($t_1$, $t_2$) and the set address (s) are not affected. An LRU pointer algorithm works to ensure that the data accessed will not be spurious. This is illustrated by referring to FIG. 3 which is a table showing what happens during different conditions which exist in the tag RAM controller after power up or reset. The LRU pointer algorithm ensures that data will always be written consistently in the manner shown by this table no matter in what condition the tag RAM bits are found after reset. The first column represents the tag RAM contents after reset, which cannot be predicted. There may be spurious bits in the tag RAM that match a tag argument (12) presented by the CPU on the CPU bus (8). Either the tags for a given line in each way are not equal (first three cases) or they are equal (last three cases).

Tag in way 0 does not equal tag in way 1

Each case in FIG. 3 is for a given set address ($s_1$). If the tag address ($t_1$ or $t_2$) presented to the associative memory matches a tag in one side of the tag RAM but not the other side, the LRU pointer is ignored, and the data are written into the way in which the match occurred. That is, a hit on the left side will cause data to be written into the left way. A hit on the right side will cause data to be written into the right way. If the tag address ($t_3$) does not match either left or right way, the data are written into the way to which the LRU bit points, which after reset will always be the left way (the LRU bit=0).

Tag in way 0 equals tag in way 1

If the tag address ($t_1$ or $t_2$) presented to the associative memory matches a tag in the left tag RAM and the right tag RAM, the LRU pointer is ignored, and the data are written into the right way. That is, a hit on the left side will cause data to be written into the right way. A hit on the right side will cause data to be written into the right way. If the tag address ($t_3$) does not match either left or right way, the data are written into the way to which the LRU bit points, which at reset will be the left way (the LRU bit=0).

Read Miss

The module begins its tag lookup to see if the read cycle is a hit. Once it has been determined that the address is not present in the cache (a miss), START# is issued to indicate to the memory system that it must service the current cycle. The module invalidates a line in the cache (or chooses a free line) in preparation for the bursted data. The data is bursted from main memory into the cache and to the CPU simultaneously. If the line was cacheable, the module updates its valid bit to indicate so. If the line is invalid, or aborted for any reason the line is left invalid.

Read Hit

During Read Hit cycles, the module responds directly to the CPU with a line of data taken from the cache. No main memory access is necessary.

Write Hit

The module is a write-through cache, so all write cycles are written by the CPU to main memory. Where the tag lookup is found to be a hit the data is updated by the cache. Write misses do not affect cache contents, nor do writes to write protected lines. Write hits will alter the LRU bit to point to the way where the line resides.

Write Miss

When a write transaction on the CPU bus involves an address which is not in the cache (a cache miss), no attempt is made to store the corresponding data in the cache. However, when a write transaction on the CPU bus involves an address which is in the cache (a cache hit), data are written into the cache as well as main memory. This ensures that main memory always holds a valid copy of all data locations.

Detailed description of Logic

Refer to FIG. 1. A cache controller (10) drives tag access (tagacc) logic (14). Tagacc logic (14) drives an associative memory left tag RAM (16) and left data cache (18), which together make up way 0 and right tag RAM (20) and right data cache (22), which together make up way 1.

Each tag RAM (16 or 20) has 17 tag bits, 1 write protect bit, and 2 valid bits, one valid bit for each of the two lines within an address block. In addition, the left tag RAM has 1 LRU bit which comprises an LRU pointer.

Left hit logic (26) and right hit logic (28) are compare circuits which provide an output to the tag interface (tagifc) control logic (30) when there is a match between the tag search argument (12) and a tag address in the associative memory. The tagifc (30) drives address-/data/status (ADS) latches (32) that latch information to be placed on the memory address/data bus (34).

Control logic (24) is connected to each of the logic blocks to provide the necessary control functions such as write enable (WE0), output enable (OE), start, etc. to the logic blocks described above.

Traditionally, an LRU pointer points to the data that is the least recently used and this is the data that is to be replaced. In the controller described in U.S. Pat. No. 5,210,845 there are two sectors for each way, which means there are two lines of data. For each address block, one line could have valid data and the other line may not have valid data as indicated by the valid bits ($v_0$, $v_1$). Valid data can be placed in only one line at a time. When the data is put in the line, then it is the most recently used data and therefore the LRU pointer should not be pointing to it. So the pointer data (zPTRDAT) line flips the LRU to point in the opposite direction. For any access to the tag RAM, the signal way select (ZWAYSEL) decides if it is to be on the left or right side. During normal cycles, ZWAYSEL has a meaning only in a line fill where a line has to be selected for filling. The tag hit signals are used in conjunction with the LRU bit to decide the value for the signal ZWAYSEL as described in patent application Ser. No. 07/691,240.

The LRU is updated on a read miss, a write hit, and on a snoop hit. On a snoop cycle, if the hit occurs on the left way, then the LRU is forced to point to the left way. If the hit occurs on the right way, then the LRU is forced to point to the right way. On a line fill just the opposite is done. If a line fill is to the left side, then the LRU is forced to point to the right side. This is because by definition if the hit put new data in, then the least recently used data is on the opposite side. The LRU flip (LRUFLP) signal from the cache controller to the TAGIFC is used to flip the LRU bit to the original way when a previous update to the same line within this cycle needs to be retracted.

The CLRVL and CLRVR signals from the cache controller to the TAGIFC clear the valid bits. The TAGIFC logic captures the output of the tag RAM at the first SHCLK after the first ADS# that begins a cycle. The captured outputs are kept in the ADS latches until the cycle ends. On a line fill, the valid information for the current line is generated as a function of SKEN#. The valid information for the other line within the set is obtained from the ADS latches. Then the information for both the lines is written into the tag RAM. The rCLRV[LR] signals are used to clear this "other" line information, when that line has been invalidated during the cycle by the flush signal (44) described below.

The zFLUSHnn signal from the process interface (PCIFC) logic block (40) drives the BRDYO, OE, logic block (24), the cache controller (10), the TAGACC logic block (14) and the tag flush logic block (42). zFLUSHnn comes off a two-clock synchronizer in PCIFC (40). If a read-hit cycle is about to begin and zFLUSHnn is active, then BRDYO and OE abort the generation of zBRDYOnn and the first enable. At the same time, START (24) generates zSTARTnn to signify a forced line-fill cycle. The cache controller logic (10) uses the zFLUSHnn signal to decide if the current cycle has been invalidated through flush. In the TAGACC logic, the tag write commands are qualified with zFLUSHnn so that the commands can be withdrawn when the tag RAM is being flushed. In the tag flush logic block (42), zFLUSHnn creates zTFLSH nn. The zTFLSHnn signal drives the left TAGRAM (16) and the right TAGRAM (20). The tag flush command is generated whenever there is a RESET (46) or an external FLUSH#(zFLUSHnn internally). The status bits ($V_0$, $V_1$, WP) in each way and the LRU bit in the left way (16) are set to zero on zTFLSHnn. All pending write requests to the tag RAM are withdrawn if zFLUSHnn is sensed.

The signals zVL0, zVL1, zVR0, zVR1 from the TAGIFC logic (30) to TAGRAM (16, 20) are status bits written into the tag RAM at every write request. The write-protect (WP) and LRU bit values are carried in zWPO and zPTRDAT, respectively. All the four values are computed each time there is an update of the status bits. At any time only one line can be updated in any one way. The tag RAM uses zWAYSEL to decide which two of the four incoming valid signals should be used for an update. However, the control logic is responsible for correctly generating the status information for two signals selected by zWAYSEL. For the current line, the valid bit can be computed (rV). The valid information for the other line is obtained from the ADS latches (zADSV[LR][01]). If the other line is snooped out, then the appropriate ADS latches would have been reset by the rCLRV[LR] signals.

The signal zWPO from the TAGIFC logic (30) to the TAGRAM (16, 20) is the write-protect value to the tag RAM written at every zWRSTS command.

The signals zWRSTS, zWRLRU, zWRTAG from the TAGACC logic (14) to the TAGRAM (16, 20) are the status bits (valid and write-protect). The LRU and the tag bits are written at the selected set address when the corresponding write-command is active. The commands are overridden by zFLUSHnn.

If EADS# or zFLUSHnn occurs along with ADS#, then it is too late to abort the tag access initiated by ADS# due to differences in set-up times. This combination of inputs means a miss. If the access turns out to be a hit, then the hit information has to be discarded. yEADSnn and zFLUSHnn are directly sampled by OE, BRDYO and START to abort the reaction to read-hit. In RLS, zLNFIL is used to abort all r[TB]O-E[AB]nn. It is also used to determine if the logic is in a self-invalidation cycle.

The zPTRDAT signal from the TAGIFC logic (30) to the TAGRAM (16, 20) is the LRU bit to be written into the tag RAM. On all tag RAM updates during normal cycles zPTRDAT is the inverse of zADSLRU. If, however, the rLRUFLP signal is active, then zPTRDAT takes the same value as zADSLRU.

The zRESET signal drives the PCIFC logic (40) which generates the signal zRESETnn which drives the RLS logic block (10), the tag flush block (42) and the OE, WE, START, MUXCON, of logic block (24). zRESET is RESET after synchronization. It takes two clocks to recognize RESET, which means that there will be two clocks before zRESET is created after RESET. At power-up, RESET should be active for at least 100 clocks to stabilize the internal clock generator. At other times, RESET can be as short as one clock. After RESET has gone away, a minimum of four clock idle bus is required before a cycle can start. zRESETnn is zRESET buffered up by the cache controller for a cross-chip route to SELCON. The tag RAM is flushed at every clock in which zRESET is active.

The signals zRLSLWP, zRLSRWP go from the TAGIFC logic (30) to the cache controller (10). The tag RAM has one write-protect bit for each way. The tag RAM outputs, tLWP and tRWP, represent the contents of those bits. In TAGIFC, the tag RAM outputs are captured at the first SHCLK after cycle starts, and kept until the cycle ends.

Pin signals for the module shown in FIG. 1 are described U.S. Pat. No. 5,210,845. They include:

Functional Description

There are five types of cycles that occur, four normal cycles and a snoop cycle:
1. Read Miss (line fill)
2. Read Hit
3. Write Miss
4. Write Hit
5. Snoop Normal cycles As described in patent application Ser. No. 07/684,180, a cycle starts with zADSCYC. and ends when any of the following three conditions are met:
1. RESET
2. BLAST# with BRDY#, RDY# or BRDYO#
3. BOFF#

Read Hit Cycle

A read hit cycle starts with zADSCYC and zRDSCYC. The tag look-up will yield a hit at the first SHCLK. BRDYO# will go active indicating a hit. Also the first output-enable (OE1) goes active. The first-enable is picked from the four possibilities using the burst address sequence. Since the cache controller is signaling the transfers at every clock with BRDYO#, the logic will advance through TO22, TO23, and TO24 at every clock (See FIG. 5). The appropriate enable is created for each transfer. If a BOFF# interrupts the transfer, then a request is made to the tag RAM to invalidate the line. The LRU bit is not updated on a read hit.

Read Miss Cycle

A read miss cycle starts with zADSCYC and zRDSCYC. The tag look-up will yield a miss at the first SHCLK. START# goes active indicating a miss. From then on, the logic will wait until SKEN# is active. If SKEN# is active before the first transfer, then the line is said to be committed. A line in the tag RAM is selected (zWAYSEL) using the zADSLRU, zADSHL and zADSHR signals as described in patent application Ser. No. 07/691,240.

Tag write commands are issued to invalidate the line, and the corresponding first write-enables are issued. An active SKEN# will result in a request to the tag RAM to validate the line, if the line is not already valid. An inactive SKEN# will result in a request to invalidate the line if the line is not already invalid. LRUFLIP will be issued along with an inactive SKEN# if the line was previously validated due to an active SKEN#, and vice versa. The write-protect pin (WP) is written at each such request. The LRU bit is made to point to the other way, if the line will be left in a valid state. If the line is valid, and the cycle is aborted with a BOFF#, then a request will be made to tag RAM to invalidate the line.

Flush Cycle

Refer to FIG. 5. The flush cycle prevents the logic from validating the line by withdrawing any pending write requests and not issuing new write requests until the cycle terminates.

Direct-Processor Write Cycle

A direct-processor write cycle starts with zADSCYC and zWRSCYC. START# goes out at the first SHCLK. If it is a hit at the first SHCLK, then the appropriate enable is sent out. The LRU bit is made to point to the other way on a hit. On a miss, nothing is done and only START# can be seen active.

Flushing Tag RAM

The tag RAM is flushed whenever zRESET or zFLUSHnn is active. It takes one clock to flush the tag RAM. All pending write-requests to the tag RAM are withdrawn at zFLUSHnn and zRESET. A zFLUSHnn during a line-fill after or at the first transfer has the same effect as a self-snoop.

Operation of the Power on/reset Procedure

Figure 4:
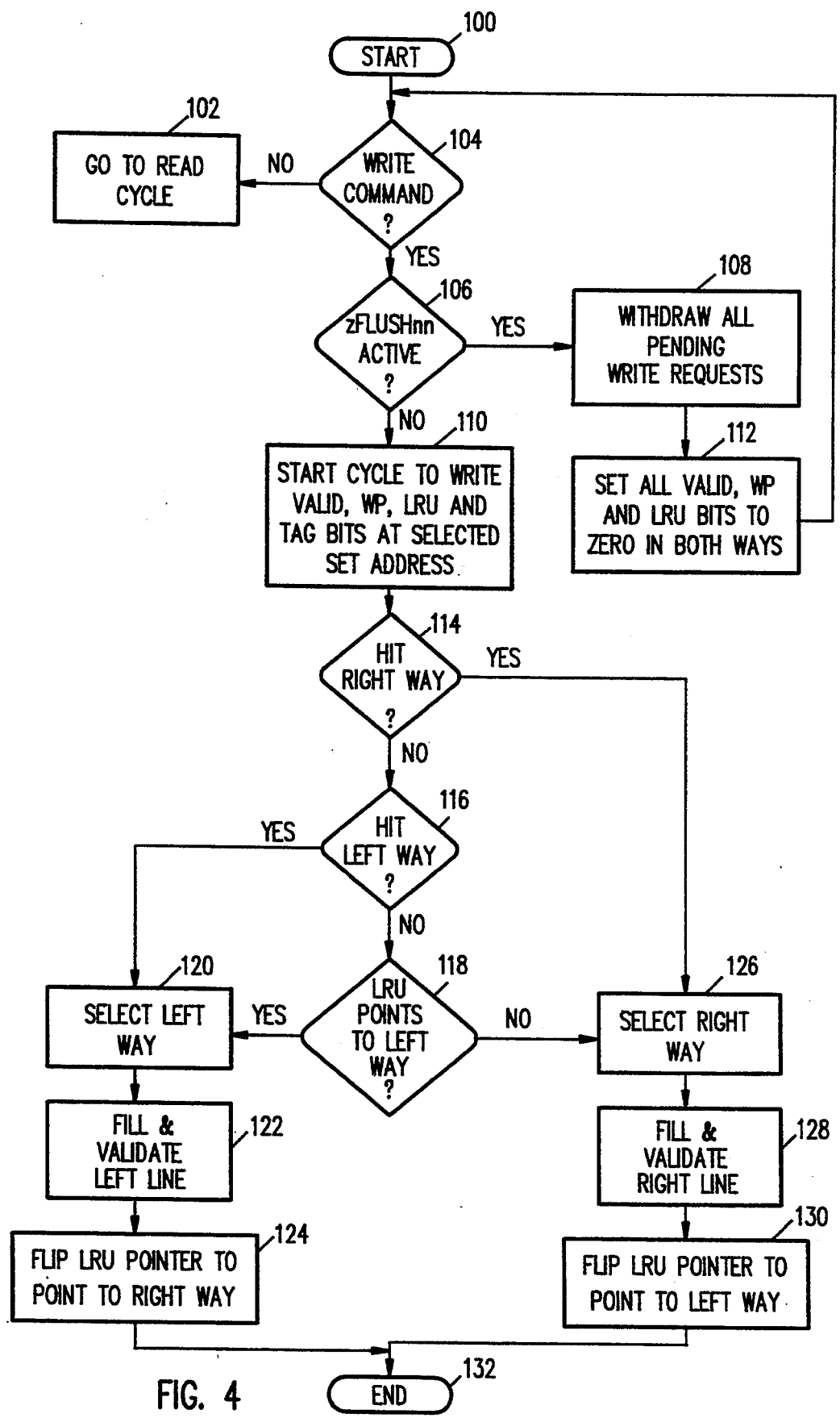
FIG. 4 is a flow chart of the power on/reset procedure.

Refer to FIG. 4 which is a flow chart of the power on/reset procedure. If a write command is not sensed (104) the flow proceeds to the read cycle (102) described in the above mentioned patent applications. If a write command is sensed, the flow proceeds to test if there is a reset signal or power on condition which has caused zFLUSHnn to be active (106). If yes, all pending write requests are withdrawn (108) in response to zFLUSHnn. Next all valid, write protect and LRU bits are set to zero in both of the ways (112). A write request recognized subsequent to the withdrawn pending write requests will result in a no out of the decision block (106). At block (110), a line fill is started to write valid bits, write protect (WP) bits, LRU and tag bits at the selected set address. A tag address is presented to the cache directory to be compared with the tag addresses stored in the right and left ways of the directory. A right hit signal is generated (114) upon the condition that a match exists between the tag and one of the tag addresses stored in the right way. A left hit signal is generated (116) upon the condition that a match exists between the tag and one of the tag addresses stored in the left way. The right way is selected (126) for a line fill in response to the right hit signal. The right line is filled and the valid bit turned on (128). The least recently used pointer (LRU) is flipped to point to the left way (130) upon the filling of the right line of the right way. The left way is selected (120) for a line fill in response to the left hit signal. The left line is filled and the valid bit turned on (122). The least recently used pointer is flipped to point to the left way (124) upon the filling of the left line of the left way and the flow ends (132).

If there was no hit on the right way (114) or the left way (116), the way that is filled is the one to which the LRU pointer points (118). After a flush, this will always be the left way, because the LRU bit is reset to zero (i.e., pointing to the left way)

If there was a hit on both the right way (114) and the left way (116), the way that is filled is the right way, even though after a flush, the LRU bit is reset to zero and is pointing to the left way.

While the invention has been particularly shown and described with reference to preferred embodiments thereof, it will be understood by those skilled in the art that the foregoing and other changes in form and detail may be made therein without departing from the scope of the invention.

What is claimed is:

1. In a cache controller tag RAM directory configured into two ways, a right way and a left way, each way including stored tag addresses, valid bits, and a write protect bit, there being least recently used (LRU) pointers that can be set to point to either said left way or said right way to indicate, as between said left way and said right way, a least recently used data entry, a combination comprising:

first means for asserting a first signal upon a first condition that a warm start reset state is recognized and a second condition that a power up state is recognized;
   second means connected to said first means for withdrawing all pending write requests in response to said first signal;
   third means connected to said first means for, in response to said first signal, only setting said valid bits, and said write protect bit to zero in each of said ways and said LRU pointers to zero to thereby point to said left way;
   said third means including means for unasserting said first signal;
   fourth means connected to said third means for starting a write cycle upon a third condition that said first signal is unasserted;
   fifth means connected to said fourth means for comparing a search tag address presented to said directory with said stored tag addresses;
   sixth means connected to said fifth means for generating a right hit signal upon a fourth condition that a match exists between said search tag address and one of said stored tag addresses stored in said right way;
   seventh means connected to said fifth means for generating a left hit signal upon a fifth condition that a match exists between said search tag address and one of said stored tag addresses stored in said left way;
   eighth means connected to said seventh means for selecting said right way for a right line fill in response to said right hit signal;
   ninth means connected to said eighth means for flipping a corresponding least recently used pointer to point to said left way upon the filling of said right line of said right way;
   tenth means connected to said seventh means for selecting said left way for a left line fill in response to said left hit signal; and,
   eleventh means connected to said tenth means for flipping said corresponding least recently used pointer to point to said right way upon the filling of said left line of said left way.

2. In a cache directory that is divided into two ways, a right way and a left way, each way including stored tag addresses valid bites, and a write protect bit, there being least recently used (LRU) pointers that can be set to point to either said left way or said right way to indicate, as between said left way and said right way, a least recently used data entry a method comprising the steps of:

A. asserting a first signal upon a first condition that a reset state is recognized and a second condition that a power up condition is recognized;
   B. withdrawing all pending write requests in response to said first signal;
   C. setting only said valid bits, and said write protect bit to zero in each of said ways and said LRU pointers to zero to thereby point to said left way, in response to said first signal;
   D. unasserting said first signal;
   E. starting a write cycle upon a third condition that said first signal is unasserted;
   F. comparing a search tag address presented to said cache directory with said stored tag addresses;
   G. generating a right hit signal upon a fourth condition that a match exists between said search tag address and one of said stored tag addresses stored in said right way;
   H. generating a left hit signal upon a fifth condition that a match exists between said search tag stored and one of said stored tag addresses stored in said left way;
   I. selecting said right way for a right line fill in response to said right hit signal;
   J. flipping a corresponding least recently used pointer to point to said left way upon the filling of said right line of said right way;
   K. selecting said left way for a left line fill in response to said left hit signal; and,
   L. flipping said corresponding least recently used pointer to point to said right way upon the filling of said left line of said left way.

3. In a cache controller tag random access memory directory configured into two ways, a right way and a left way, each way including stored tag addresses, valid bits, and least recently used (LRU) pointers that can be set to point to either said left way or said right way to indicate, as between said left way and said right way, a least recently used data entry, a combination comprising:

a processor interface for asserting a flush signal upon a first condition that a warm start reset state is recognized and a second condition that a power up state is recognized;
   a cache controller connected to said processor interface for withdrawing all pending write requests in response to said flush signal being asserted;
   tag flush logic connected to said processor interface for, in response to said flush signal, only setting said valid bits to zero in each of said ways and said LRU pointers to zero to thereby point to said left way;
   said tag flush logic including means for unasserting said flush signal;
   tag access logic connected to said processor interface for starting a write e cycle in response to said flush signal being unasserted;
   a tag random access memory connected to said tag access logic for comparing a search tag address presented to said directory with said stored tag addresses;

a right hit compare circuit connected to said tag random access memory for generating a right hit signal upon a third condition that a match exists between said search tag address and one of said stored tag addresses stored in said right way;

a left hit compare circuit connected to said tag random access memory for generating a left hit signal upon a fourth condition that a match exists between said search tag address and one of said stored tag addresses stored in said left way;

a tag interface connected to said left hit compare circuit and to said right hit compare circuit for selecting said right way for a right line fill in response to said right hit signal and for selecting said left way for a left line fill in response to said left hit signal; and, a tag interface connected to said eighth means for flipping a corresponding least recently used pointer to point to said left way upon the filling of said right line of said right way;

said tag interface including second means connected to said right hit compare circuit for flipping said least recently used pointer to point to said right way upon the filling of said left line of said left way.

* * * * *